US006951891B2

(12) United States Patent
Baltussen et al.

(10) Patent No.: US 6,951,891 B2
(45) Date of Patent: Oct. 4, 2005

(54) PROCESS TO MAKE DISPERSIONS

(75) Inventors: Jozef Johannes Maria Baltussen, Nijmegen (NL); Jan Visser, Arnhem (NL)

(73) Assignee: Akzo Nobel N.V. (NL)

( * ) Notice: Subject to any disclaimer, the term of this patent is extended or adjusted under 35 U.S.C. 154(b) by 342 days.

(21) Appl. No.: 10/209,047

(22) Filed: Jul. 31, 2002

(65) Prior Publication Data

US 2003/0024878 A1 Feb. 6, 2003

Related U.S. Application Data

(60) Provisional application No. 60/309,947, filed on Aug. 3, 2001.

(51) Int. Cl.[7] ............................ B01F 3/08; C08K 3/20; C08L 67/08; C08L 71/02

(52) U.S. Cl. ........................ 516/20; 366/158.5; 516/53; 516/925; 524/588; 524/601; 524/612

(58) Field of Search ........................... 516/53, 925, 20; 366/158.5; 524/588, 601, 612

(56) References Cited

U.S. PATENT DOCUMENTS

| | | | | | |
|---|---|---|---|---|---|
| 4,773,833 | A | | 9/1988 | Wilkinson et al. | 417/539 |
| 5,116,536 | A | * | 5/1992 | Bucheler et al. | 424/401 |
| 5,326,484 | A | * | 7/1994 | Nakashima et al. | 516/29 |
| 6,103,786 | A | * | 8/2000 | Hoch et al. | 523/336 |
| 6,165,320 | A | | 12/2000 | Bates et al. | 162/135 |

FOREIGN PATENT DOCUMENTS

| | | | |
|---|---|---|---|
| DE | 38 18 453 A1 | 12/1989 | B01F/5/06 |
| EP | 765 896 A1 | 4/1997 | C08G/77/06 |

OTHER PUBLICATIONS

CAPLUS accession No. 1991:457814 for Kandori., "Preparation of monodispersed W/O emulsions by Shirasu–porous–glass filter emulsification technique," Colloids and Surfaces, vol. 55, 1991.*

CAPLUS accession No. 1994:559749 for Ban et al., "Preparation of O/W emulsions on SPG membrane," Nippon Kagaku Kaishi, vol. 8, 1994.*

CAPLUS accession No. 2001:76199, Vladisavljevic et al., "Preparation of water–in–oil emulsions using microporous polypropylene hollow fibers: conditions for producing small uniform droplets," Chemical Papers, vol. 54, No. 6a, 2000.*

Chemical abstracts accession No. 1999:310310 for Kawakatsu et al., "Emulsion breakdown: mechanisms and development of multilayer membrane," AlChe Journal, 1999, vol. 45, No. 5, abstract.*

Suzuki et al., "Preparation of High Concentration O/W and W/O Emulsions by the Membrane Phase Inversion Emulsification Using PTFE Membranes," Food Science Technology Research, 1999, vol. 5, No. 2, pp. 234–238.*

Derwent Abstract No. 008092758 abstracting DE 38 18 453, Dec. 1989.

* cited by examiner

*Primary Examiner*—Robert Sellers
(74) *Attorney, Agent, or Firm*—Louis A. Morris

(57) ABSTRACT

The present invention relates to the production of dispersions and is particularly suitable for making dispersions with a viscous or solid dispersed phase in a continuous phase with a lower viscosity.

61 Claims, 4 Drawing Sheets

PROCESS TO MAKE DISPERSIONS

Figure 1:
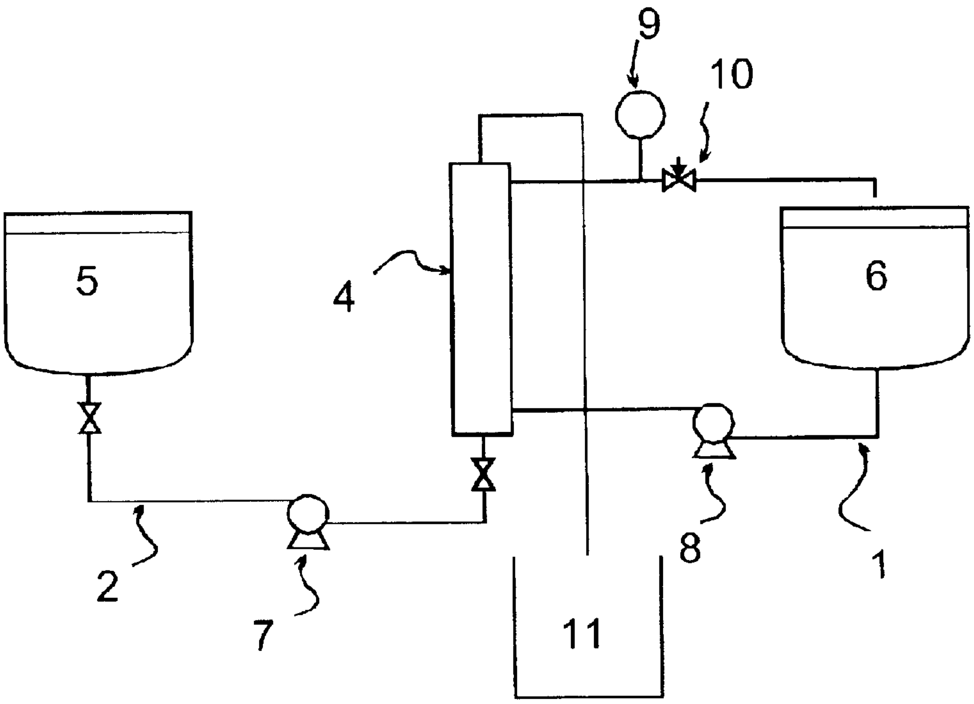

The present application claims priority from U.S. Provisional Patent Application Ser. No. 60/309,947, filed Aug. 3, 2001.

The present invention relates to the production of dispersions and is particularly suitable for making dispersions with a viscous or solid dispersed phase in a continuous phase with a lower viscosity.

Traditionally emulsions are made using colloid mills, rotor-stator systems, and homogenisers, as described in e.g. DE 3818453 A1 and U.S. Pat. No. 4,773,833. In this type of apparatus a mixture of mutually insoluble or only slightly soluble liquids passes through a space with intense agitation. Due to the high shear forces exerted on the mixture, small droplets are created. This method is known as high-shear emulsification. In general, the droplet size is a decreasing function of the energy dissipation in the process.

Inversion emulsification is an alternative technique for making emulsions, in particular emulsions of a highly viscous liquid in a low-viscous liquid. With this technique the low-viscous liquid is slowly added to the highly viscous liquid in a stirred tank, making an emulsion of the low-viscous liquid in the highly viscous liquid. At a critical concentration of the low-viscous liquid inversion of the emulsion occurs, creating an emulsion of the highly viscous liquid in the low-viscous liquid. An example of this method can be found in U.S. Pat. No. 6,165,320.

More recently a method has been developed for making dispersions with micro-filtration membranes as described in EP 0765 896 A1. With this technique an organoalkoxysilane is transported, pressed through a porous membrane into the continuous phase, and subsequently condensed. By transporting one phase through the pores, small droplets of this phase are created in the continuous phase, due to the geometry of the membrane and the flow of the continuous phase along the membrane surface. In this patent this method is called "direct membrane emulsification".

In the process according to the present invention, a device is used in which two streams are separated while allowing some transport of one stream through the separating means to the other stream, with the conditions being chosen such that in said process the dispersion is inverted. Preferably, droplets of the material of one stream form in the other stream. The size of the droplets is dependent on the operational conditions of the device and the rheological properties of the two streams. For ease of reference, hereinafter the stream transported through the separating means of the device is called stream 1. Thus, before inversion, droplets of the material of stream 1 form in stream 2 with the aid of the separating means of the device.

Preferred separating means are membranes, such as nano-filtration (0.8 nm up to 9 nm pores), ultra-filtration (3 nm up to 100 nm pores), micro-filtration (50 nm up to 3 $\mu$m pores), and particle-filtration (2 $\mu$m up to 2 mm pores) membranes. The separating means thereof as used in the present process can have any possible shape, typical shapes are tubes, fibers, plates, sheets, spiral wound, etc. The separating means can be reinforced by another material such as ceramics, metals, polymers, etc. Other examples of suitable separating means are walls equipped with nozzles, spinnerets, or any other perforated objects like sieves, dead end filters, perforated plates or tubes. The separating means can also consist of needles, tubes or hollow fibers running across a wall from stream 1 to stream 2, producing droplets of the product of stream 1 in stream 2. Most separating means can be characterized by a pore diameter or a pore size distribution. Preferably, average pore sizes are in the range of 0.005 $\mu$m up to 1,000 $\mu$m. More preferably, the pores are on average larger than 0.01, even more preferably larger than 0.1, most preferably larger than 0.2 $\mu$m. Preferably, the pores are on average smaller than 100, more preferably smaller than 10, and most preferably smaller than 5 $\mu$m. The extremes of the distribution may be considerably smaller or larger. The characteristics of the final emulsion can be influenced by selecting separating means with a particular pore size distribution, for example by using a membrane with a narrow pore size distribution producing droplets with a narrow droplet diameter distribution.

In the device the transport through the separating means can be in either direction. For example, if a porous membrane is used to separate the two streams, droplets can be formed at either side of the membrane, depending on the operating conditions.

FIG. 1 represents a schematic drawing of the set-up used for an inverse membrane emulsification experiment. Tank 5 contains stream 2 material that is transported with pump 7 to device 4 comprising a separating means. Tank 6 contains stream 1 material that is transported with pump 8, through the separating means of device 4, into stream 2. The combined streams finally form an emulsion of stream 2 material in stream 1 material, and this emulsion is collected in tank 11.

Figure 2:
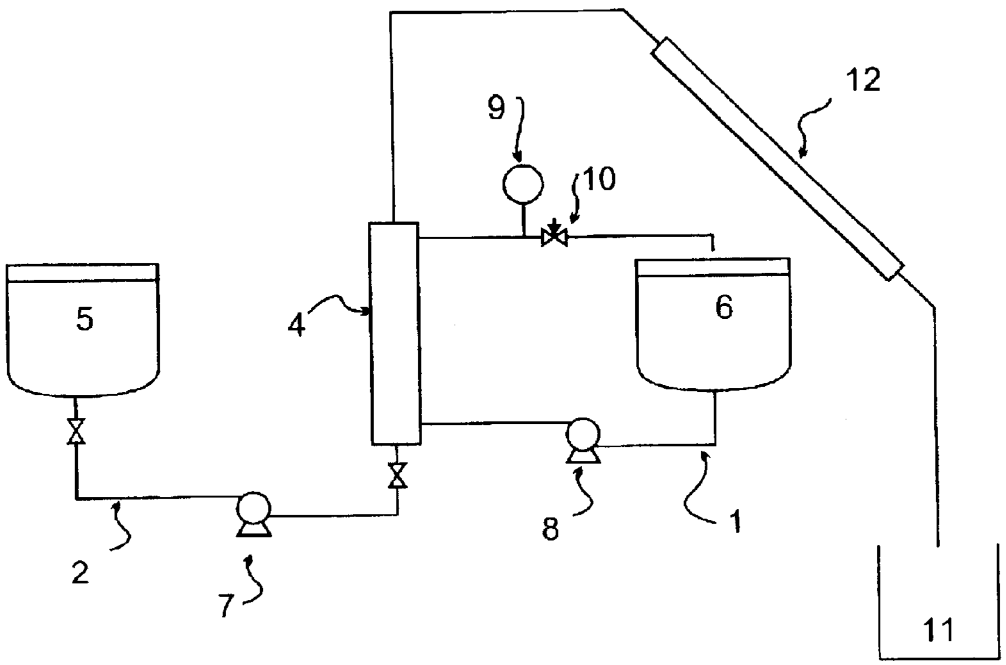

FIG. 2 represents a schematic drawing of the set-up used for another inverse membrane emulsification experiment. This representation is similar to the schematic drawing in FIG. 1, except that a cooling device 12 is attached to device 4.

Figure 3:
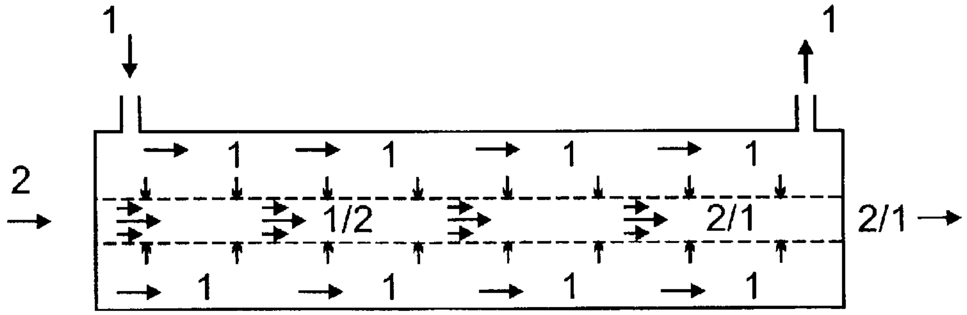

FIG. 3 represents a schematic drawing of the device used for the inverse membrane emulsification experiment. The device is a tube, or any other piece of equipment, comprising two chambers separated by a membrane. Stream 2 material is pumped into one chamber (inner side of the membrane), and stream 1 material is pumped into the other chamber (outer side, or shell side, of the membrane), through the membrane, into the stream 2 material to form an emulsion. The mixture of stream 1 material and stream 2 material finally forms an emulsion of stream 2 material in stream 1 material.

Figure 4:
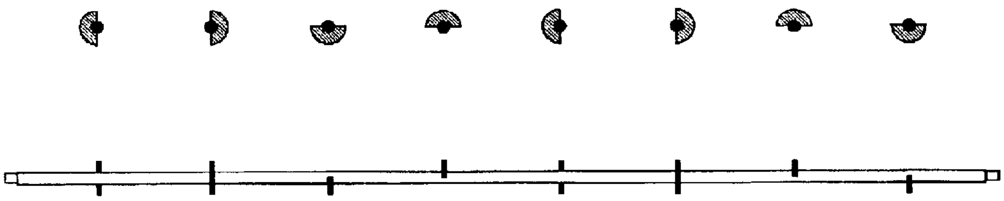

FIG. 4 represents a schematic drawing of a static mixer consisting of semi circular flat baffles mounted on a central shaft, used for improvement of the flow inside a membrane tube. The lower part of the drawing is a side view of the static mixer and the upper part shows the baffles in front view.

The device itself may be housing, tank, tube, or any other piece of equipment capable of containing at least the separating means and said two streams. It is possible to equip one device with two or more separating means, if so desired. For example, ten tubular membranes may-be comprised in a single housing. If more separating means are present in one device, they may be mounted parallel and/or in series. It is also possible that two or more separating devices with different properties are mounted in series. For example, two tubular membranes with different pore sizes can be mounted in series in order to optimize the properties of the emulsion. A preferred choice for the pore sizes is such that the droplets made with the second membrane fit in the inner spaces between the first droplets.

In a final apparatus, the device is connected to further conventional equipment, such as pumps. The device can be connected to the other equipment such that the flow of the two streams is a cross-flow or transverse flow. Also, the configuration can be in-line or staggered. Furthermore, other streams may be mixed into one or more of the streams within the device. It is noted that further means may be present within the device to assist in the dispersion of stream 1 in stream 2, or to assist in the inversion of the dispersion, such as (static) mixers (as an example, see FIG. 4), packing material, rough surfaces, and/or movable parts. If so desired, two or more devices may be used parallelly or in series. Also the particular shape of the separating means may enhance the mixing in the device. Also, equipment may be present that allows the amount of continuous phase in the final emulsion to be reduced, meaning an increase in the concentration of the dispersed phase. It is possible that additional streams are connected to the device. These streams can be used for the supply of any material, e.g. the material of stream 1, the material of stream 2 or emulsifiers. As an example, the device may be such that stream 2 and a separate stream comprising surfactant are dispersed in stream 1.

A preferred configuration for the process will be a continuous process as shown in FIGS. 1 and 2. It is also possible to run the process of invention as a batch process, e.g. with a tank, or a stirred tank as a part of the device. The tank is used for circulation of the dispersion over the separating means, or the separating means is inserted in the tank. The tank may be equipped with an agitator for homogenizing of the tank contents. In a batch process with external separating means the emulsion is circulated over the separating means until inversion of the emulsion occurs. In a preferred batch operation with an internal separating means, stream 2 is present in the reactor and material of stream 1 is transported through the separating means until inversion of the dispersion occurs in the reactor. Preferably, the reactor is stirred during such a process. As an example of a preferred batch operation, one takes a stirred tank fitted with a dead end separating means. Stream 2 is being stirred, and stream 1 is being dispersed into stream 2.

The streams may enter the apparatus and the device at any possible temperature and pressure. It is also possible for the two streams to have different temperatures. If so desired, the device may contain further heating or cooling means.

For a continuous process, on entrance into the device streams 1 and 2 are separated, as in FIG. 3. Flowing along or across the device, droplets of material 1 are formed in stream 2. During this stage the material of stream 2 is the continuous phase and the material of stream 1 transported through the separating means is the dispersed phase. Optionally, part of the resulting material may be circulated over the device. Subsequently inversion of the continuous and the dispersed phase occurs. After the inversion, the material of stream 2 is the dispersed phase and the material of stream 1 transported through the device in stream 2 is the continuous phase. The size of the dispersed phase droplets/particles as produced with the present process using with the device can be as small as a fraction of a micrometer, e.g. 0.005 $\mu$m, and as large as several millimeters. This applies to the dispersed phase both before and after the inversion.

The normal situation is that inversion will occur within the device. However, it is also possible that inversion will occur immediately upon the material of stream 1 coming into contact with the material of stream 2. In this case the initial state, with a one-in-two dispersion, is short-lived or totally absent. Furthermore, it is also possible for the inversion to occur downstream of the device, possibly as a result of the addition of some further amount of material of stream 1, the addition of any other material and/or changing the temperature of the 1 in 2 dispersion.

Both streams may have an arbitrary viscosity and composition. In general, the materials of stream 1 and stream 2 are mutually not completely miscible liquids. Both streams may contain liquids, solids, and gases. The liquids of both streams may be aqueous or organic liquids. Organic liquids are here considered to include silicon oils and siloxanes. If present, solids will typically be present in stream 2, which is not transported through the membrane. Examples of solids are pigments, polymers, and heterogeneous catalysts. The process of the invention is particularly suitable for the production of an emulsion of a viscous or solid dispersed phase in a liquid with a lower viscosity, for example suspensions and/or emulsions of resins in water, rosin in water, internal or surface sizing agents for paper in water, and bitumen in water.

The process of the invention is particularly suitable for the production of emulsions with a high concentration of dispersed phase. The upper limit is about 99% by weight of the final formulation (wt %) of dispersed phase. Preferably, a concentration of 0.01–99 wt % dispersed phase is obtained depending on the operational conditions. More preferably, the dispersed phase represents 10–95 wt % of the final formulation. Even more preferred, a dispersed phase represents 40–90 wt % of the final formulation. Most preferred is a dispersed phase of 75–90 wt % of the final formulation.

Both stream 1 and stream 2 can be an emulsion as such. If stream 2 is an emulsion, the final emulsion produced with the process of the invention can be a double emulsion. In both streams, emulsifiers and/or other components may be present. These components may form an interfacial layer or can be transported from the dispersed phase to the continuous phase or vice versa. The mixtures in stream 1 and/or stream 2 can also be a reactive system. For example, stream 1 may contain a homogeneous catalyst, or stream 2 may comprise a liquid monomer which can be polymerized after phase inversion in a subsequent process. Similarly, reactive resins can be used that can be cross-linked or chain-extended after phase inversion. As another example, stream 2 may be a homogeneous or heterogeneous reactive system which is dispersed in stream 1 after and/or during which process it reacts to form a dispersion of the resulting reaction product in stream 1. Such a reaction may be catalyzed by, or involve a component of stream 1. As a third example, stream 1 and/or stream 2 may comprise ingredients that form a solid reaction product which can encapsulate the stream 2 material, or the remainder of stream 2 material.

The process of the invention is particularly suitable for the emulsification of liquid/solid dispersions in a second liquid, such as the production of a coating in water emulsion. The complete coating containing solid pigments can be dispersed without the coating composition passing through a membrane or a high-shear apparatus. The process of the invention can be designed for use by the end user of the coating.

The process of the invention is suitable for the production of coating formulations containing one or more components produced with the claimed process for automotive, plastic, decorative, metal, wood and car refinishing applications. These components may be reactive. Also the process of invention is suitable for the production of emulsions for applications in the field of printing inks.

The process of the invention is also suitable for the production of domestic fabric-softening and/or of hair care conditioner compositions. Such compositions can be a dispersion of any suitable softener and/or conditioner. Preferably, it is a dispersion of a quaternary ammonium compound or amphoteric. Typically, conventional further additives are needed to make the final fabric-softening and/or of hair care conditioner compositions. They can be based on any suitable quaternary surfactants. Examples of quaternary surfactants are di(hydrogenated tallow) alkyldimethyl quaternary ammonium salts of chlorine or methylsulfate and ester quaternary ammonium salts.

Advantages of the process of the invention:

1) Compared to direct membrane emulsification:

With the process of invention a lower pressure and, consequently, a lower energy consumption is needed to make an emulsion of a viscous phase in a phase with lower viscosity. Also, throughputs can be increased. More particularly, in a direct membrane emulsification process, the viscous phase must be transported through the pores of the membrane, for which a large pressure or other driving force is needed. In the process of the invention the low-viscous phase is transported through the separating means, for which a much lower pressure or other driving force is sufficient. Due to the low resistance against flow of the low-viscous material passing through the device, not only the pressure difference for operation of the process can be low, but also higher fluxes through the membrane can be obtained. A higher flux through the device implies a higher production capacity. Furthermore, due to the low pressure difference over the separating means, smaller pumps are sufficient for the emulsification process. All these advantages will reduce the costs of the production process and thus of the final product.

The process of the invention can be performed with simple equipment, such as small pumps, which can be installed at the customer's, thus enabling production on site. This may reduce transport costs, as only the concentrated product is transported.

The continuous phase of the final emulsion is pumped through the separating means. Often this continuous phase will cause little fouling, since it typically is a low-viscous liquid. For example, pumping water through a membrane does not cause much fouling, but pumping a resin through a membrane does. Thus, compared to the direct emulsification process, the process of the invention will cause less fouling of the device. Little fouling is also an advantage in the case of batch production with different products produced with the same apparatus.

An advantage of the process of the invention is that it is possible to disperse a phase comprising solids and/or other particles in the second phase. For example, it is possible to emulsify a complete coating in water.

With the process of invention it is possible to make a water in oil dispersion using a hydrophilic membrane and transporting oil through the membrane. Similarly it is also possible to make an oil in water dispersion using a hydrophobic membrane and transporting water through the membrane. The use of either a hydrophilic or a hydrophobic membrane may have benefits.

As the product of the stream that is dispersed (in the final dispersion) does not flow through the separation means, the properties of said dispersed phase are not affected by the material of which the separating means consist. This can be important for the flavor and taste of the final product. For example, the finally dispersed phase may comprise small amounts of flavors and/or aromas. In a conventional direct membrane emulsification process, said flavors and/or aromas can absorb into the membrane, influencing the organoleptic properties of the final dispersion.

2) Compared to high shear emulsification:

The pore size of the device, in combination with the pressures and flow velocities in the apparatus, gives a possibility to control the droplets size of the emulsion created with the process of the invention.

Production of emulsions with small droplets, smaller than 1.0 $\mu$m, or even smaller than 0.3 $\mu$m, is much easier than with conventional emulsification techniques.

As the droplets are created by the separating means, a lower concentration of emulsifiers may be sufficient for the production of a stable dispersion.

The process of the invention has no need for (fast) rotating equipment, which is often used for the production of emulsions of viscous liquids in a low-viscous continuous phase, such as water. Also, there is no need for the high pressures necessary in homogenisers. This means that the system will need less maintenance and will be more reliable than conventional high shear emulsification equipment.

The overall energy consumption of the process of invention is much lower than that of conventional high-shear emulsification processes.

The particles in stream 2 are not exposed to high forces in high-shear equipment which may damage the particles.

Emulsification of streams with solid particles would cause damage to or increased wear of high-shear emulsification apparatus.

3) Compared to conventional inversion processes:

The process of invention can be implemented as a continuous process.

As the low viscous component is transported through the separating means it is simple to obtain a high production rate, in particular compared to a conventional batch inversion process.

With the process of the invention a better control of the droplet size can be obtained.

The fact that the process can be conducted in a way that minimises the time that a reactive mixture may be exposed to potentially reactive conditions before phase inversion is complete, may allow the emulsification of mixtures that are too reactive to undergo a conventional batch phase inversion process.

To elucidate the invention, we refer to the following, non-optimized, examples:

EXAMPLE 1

A resin in water emulsion was produced in the set-up sketched in FIG. 1. A device with separating means in accordance with FIG. 3 was used. Pump 7 and pump 8 were both Verder® gear pumps with a capacity of 96 liters/hour (l/h). The device 4 with separating means was a Microdyn® microfiltration module SE 020 TP 1N with three tubular polyethylene membranes having an average pore size of 1.0 $\mu$m and an inner diameter of 5.0 mm. Tank 5 was filled with:

2000 grams Burez® SLE 3001, a product of Eka Chemicals B.V., Maastricht, the Netherlands, 120 grams Sermul® WA 188, a product of CONDEA Servo B.V., Delden, the Netherlands, 60 grams Triethanolamine (TEA), a product of Vos B.V., Alphen a/d Rijn, the Netherlands, 1000 grams terpenes, from Akzo Nobel Chemicals GmbH, Germany.

Its contents were mixed with a conventional pitched blade turbine and heated to 60° C. Tank 5 was connected to the inner side of the tubular membrane. In this example the contents of tank 5 were stream 2.

Tank 6 was filled with tap water of the Akzo Nobel location in Arnhem and refilled during the experiment if necessary. Tank 6 was connected to the outer side (shell side) of the membrane. The pressure of the water was 3.5 bar, thus the pressure difference over the membrane was 2.5 bar. In this experiment the contents of tank 6 were stream 1.

The experiment was performed with water flowing along and through the membrane with pump 8 at approximately 45 l/h, and pump 7 at a volume flow of approximately 8.3 l/h .The resin mixture flowed through the inner side of the membrane tubes.

After some time an emulsion of resin in water flowed into tank 11 and a sample was taken from this stream. The sample was analyzed with the Mastersizer® S, using the standard presentation file 3OHD. The droplet diameter distribution was characterized by d(v,x) values, being the volume fraction x of dispersed phase with a droplet diameter below d(v,x). The droplet diameter distribution of the sample was characterized by d(v,0.1)=0.27 μm, d(v,0.5)=0.49 μm and d(v,0.9)=0.95 μm.

EXAMPLE 2

A resin in water emulsion was produced in the set-up sketched in FIG. 2. Pump 7 was a Verder® gear pump with a capacity of 150 l/h and pump 8 a Verder® gear pump with a capacity of 96 l/h. The device with separating means was a membrane module with a hydrophobic microporous membrane of SPG Technology Company, Ltd., Japan. The membrane had an average pore size of 1.1 μm, an inner diameter of 10 mm and a length of 250 mm. The cooling device 12 was attached to 4. Half circular flat baffles mounted on a central shaft were placed in inside the membrane in order to improve the mixing and flow in the device. A drawing of the baffles on the shaft is shown in FIG. 4.

Tank 5 was filled with:

2000 grams Burez® SLE 3001, a product of Eka Chemicals B.V., Maastricht, the Netherlands, 120 grams Sermul® WA 188, a product of CONDEA Servo B.V., Delden, the Netherlands, 60 grams Triethanolamine (TEA), a product of Vos B.V., Alphen a/d Rijn, the Netherlands.

Its contents were mixed with a pitched blade turbine and heated to 140° C. Tank 5 was connected to the inner side of the tubular membrane. In this example the contents of tank 5 were stream 2.

Tank 6 was filled with tap water at ambient temperature of the Akzo Nobel location in Arnhem and refilled during the experiment if necessary. Tank 6 was connected to the outer side (shell side) of the membrane.

In a first step with pump 7 at 22.5 l/h and pump 8 at 30 l/h a water in resin emulsion was produced in tank 11. For the second step tank 5 was filled with this emulsion and pumped through the membrane again with pump 7 at 13.6 l/h and pump 8 at 40 l/h. At this point a resin in water emulsion was produced and a sample was taken from this stream.

The sample was analyzed with the Mastersizer® S, using the standard presentation file 3OHD. The droplet diameter distribution was characterized by d(v,x) values, being the volume fraction x of dispersed phase with a droplet diameter below d(v,x). The droplet diameter distribution of the sample was characterized by d(v,0.1)=0.24 μm, d(v,0.5)=0.33 μm and d(v,0.9)=0.45 μm.

EXAMPLE 3

Example 3 was performed similar to the experiment in Example 2 with a massive steel rod with a diameter of 4.6 mm in the center of the tubular membrane, instead of the shaft with baffles as used in the experiment in Example 2.

In a first step with pump 7 at 22.5 l/h and pump 8 at 30 l/h a water in resin emulsion was produced in tank 11. For the second step, tank 5 was filled with this emulsion and pumped through the membrane again with pump 7 at 45 l/h and pump 8 at 50 l/h. At this point a resin in water emulsion was produced and a sample was taken from this stream.

The sample was analyzed with the Mastersizer® S, using the standard presentation file 3OHD. The droplet diameter distribution was characterized by d(v,x) values, being the volume fraction x of dispersed phase with a droplet diameter below d(v,x). The droplet diameter distribution of the sample was characterized by d(v,0.1)=0.26 μm, d(v,0.5)=0.43 μm and d(v,0.9)=0.70 μm.

EXAMPLE 4

A resin in water emulsion was produced in a similar way as described for the experiment in Example 3. In this experiment a steel rod with a diameter of 6 mm was used for improved flow and mixing in the membrane tube. Tank 5 was filled with:

4000 grams of a conventional long oil alkyd resin, based on sunflower fatty acid (40%, pentaerithritol, phtalic anhydride, and benzoic acid), with a molecular weight about 60,000 dalton, and a viscosity of 3–6 Pas at a concentration of 70% in a mixture of xylene:methoxypropanol (v/v 4:26) at 23° C., 165 grams Atsurf® 3969, 71 grams Aerosol® TR70.

Its contents were mixed with a pitched blade turbine and heated to 180° C. Tank 5 was connected to the inner side of the tubular membrane. In this example the contents of tank 5 were stream 2.

Tank 6 was filled with tap water at 90° C. of the Akzo Nobel location in Arnhem and refilled during the experiment if necessary. Tank 6 was connected to the outer side (shell side) of the membrane.

The experiment was started with water flowing along and through the membrane with pump 8 at 30 l/h, and pump 7 at 75 l/h. After a while, a resin in water emulsion was produced and a sample was taken from this stream.

The sample was analyzed with the Mastersizer® S, using the standard presentation file 3OHD. The droplet diameter distribution was characterized by d(v,x) values, being the volume fraction x of dispersed phase with a droplet diameter below d(v,x). The droplet diameter distribution of the sample was characterized by d(v,0.1)=0.23 μm, d(v,0.5)=0.51 μm and d(v,0.9)=1.43 μm. The solid contents of the sample was 85 wt % and a conventional conductivity measurement showed that water was the continuous phase of the sample. This sample shows that the process of invention is suitable for the production of emulsions with a high solid contents.

EXAMPLE 5

A resin in water emulsion was produced with a batch process wherein product of 4 was re-circulated to tank 5. Pump 7 was a Verder® gear pump of 150 l/h and pump 8 a Verder® gear pump with a capacity of 96 l/h. The device with separating means was membrane module with a hydrophobic microporous membrane of SPG Technology Company, Ltd., Japan. The membrane had an average pore size of 0.5 μm, an inner diameter of 10 mm and a length of 100 mm.

Tank 5 was filled with:

2000 grams of Setal® 293 from Akzo Nobel Resins, Bergen op Zoom, the Netherlands, 108.5 grams Atsurf® 3969, 72 grams Aerosol® TR70.

Its contents were mixed with a pitched blade turbine and heated to 75° C. Tank 5 was connected to the inner side of the tubular membrane. In this example the contents of tank 5 were stream 2.

Tank 6 was filled with tap water at 75° C. of the Akzo Nobel location in Arnhem and refilled during the experiment if necessary. Tank 6 was connected to the outer side (shell side) of the membrane.

The experiment was started with resin through the membrane with pump 7 at 60 l/h, at this time pure resin flowed into tank 5. After about one minute pump 8 was turned on and after some time an emulsion of water in resin flowed into tank 5. Pump 8 was controled manually in order to increase slowly the water content in tank 5. After 1 hour the emulsion inverted into a resin in water emulsion. A sample of the resin in water emulsion was taken and was analyzed with the Mastersizer® S, using the standard presentation file 3OHD. The droplet diameter distribution was characterized by d(v,x) values, being the volume fraction x of dispersed phase with a droplet diameter below d(v,x). The droplet diameter distribution of the sample was characterized by d(v,0.1)=0.62 $\mu$m, d(v,0.5)=1.10 $\mu$m and d(v,0.9)=1.69 $\mu$m. The solid contents of the sample was 81.3 wt % and a conventional conductivity measurement showed that water was the continuous phase of the sample. This sample shows that the process of invention is suitable for the production of emulsions with a high solid contents.

EXAMPLE 6

A resin in water emulsion was produced according to the method described in example 3. In this experiment a hydrophobic SPG membrane with a pore size of 0.5 $\mu$m and a length of 100 mm was used. A central shaft with a diameter of 6 mm was mounted in the membrane tube for improved flow and mixing.

Tank 5 was filled with:

4000 grams of Setal® 293 from Akzo Nobel Resins, Bergen op Zoom, the Netherlands, 217 grams Atsurf® 3969, 174 grams Aerosol® TR70.

Its contents were mixed with a pitched blade turbine and heated to 160° C. Tank 5 was connected to the inner side of the tubular membrane. In this example the contents of tank 5 were stream 2.

Tank 6 was filled with 3000 grams tap water at 90° C. of the Akzo Nobel location in Arnhem, 28.4 grams lithium hydroxide monohydrate.

Its contents were mixed with a pitched blade turbine and heated to 90° C. Tank 6 was connected to the outer side (shell side) of the membrane.

The experiment was performed with pump 7 at 45 l/h and pump 8 at 50 l/h. After some time a resin in water emulsion was produced and a sample was taken from this stream. A conventional conductivity measurement showed that water was the continuous phase of the sample.

The sample was analyzed with the Mastersizer® S, using the standard presentation file 3OHD. The droplet diameter distribution was characterized by d(v,x) values, being the volume fraction x of dispersed phase with a droplet diameter below d(v,x). The droplet diameter distribution of the sample was characterized by d(v,0.1)=0.30 $\mu$m, d(v,0.5)=0.62 $\mu$m and d(v,0.9)=1.16 $\mu$m.

The same process can be used for the emulsification in water of bitumen, quaternary ammonium compounds, acrylate-copolymers, polyester resins, melamine-formaldehyde resins, and UV/EB-hardening resins.

What is claimed is:

1. A process for making a dispersion using a device comprising at least one separating means that separates two streams, involving the steps of:

allowing a flow of stream 1 into stream 2 through a device comprising at least one separating means, such that stream 1 is dispersed in stream 2, optionally, continuing said flow of stream 1 into stream 2 such that the continuous and the dispersed phase can be inverted, and inversion of the said two phases, resulting in a dispersion of the material of stream 2 in the material of stream 1.

2. The process of claim 1 wherein the viscosity of stream 2 is higher than the viscosity of stream 1.

3. The process of claim 1 or 2 wherein the dispersion is an emulsion.

4. The process of any of the previous claims wherein the separating means is formed by at least one membrane.

5. The process of claim 4 wherein the separating means comprises a nano-filtration membrane.

6. The process of claim 4 wherein the separating means comprises a micro-filtration membrane.

7. The process of claim 4 wherein the separating means comprises an ultra-filtration membrane.

8. The process of claim 4 wherein the separating means comprises a particle-filtration membrane.

9. The process of claim 1 wherein the average size of the initially dispersed phase (stream 1) is 0.005–1,000 □m.

10. The process of claim 1 wherein the average size of the final dispersed phase (stream 2) is 0.005–1,000 □m.

11. The process of claim 1 wherein at least one separating means is contained in one device.

12. The process of claim 1 wherein the device comprises a stirred tank.

13. The process of claim 1 wherein the device comprises a membrane unit.

14. The process of claim 13 wherein the membrane unit has a circulation loop over the membrane.

15. The process of claim 1 wherein the process is a continuous process.

16. The process of claim 1 wherein the process is a batch process.

17. The process of claim 1 wherein a tank or a stirred tank is a part of the device.

18. The process of claim 1 wherein the device or parts of the device are heated and/or cooled.

19. The process of claim 1 wherein the streams 1 and 2 have a different temperature.

20. The process of claim 1 wherein the device comprises further means to facilitate the dispersing of stream 1 into stream 2, such as packing material.

21. The process of claim 1 wherein further streams are mixed into stream 1 and/or stream 2.

22. The process of claim 1 wherein phase inversion occurs within the device.

23. The process of claim 1 wherein phase inversion occurs after the initial dispersion leaves the device.

24. The process of claim 1 wherein phase inversion occurs as a result of the addition of further material.

25. The process of claim 1 wherein the separating means is tubular and the production of the dispersion occurs at the inner side of the tubular separating means.

26. The process of claim 1 wherein the separating means is tubular and the production of the dispersion occurs at the outer side of the tubular separating means.

27. The process of claim 1 wherein the device is equipped with further means to facilitate the dispersion process.

28. The process of claim 1 wherein additional streams are connected to the device.

29. The process of claim 1 wherein additional streams are connected to the device for the supply of emulsifiers.

30. The process of claim 1 wherein the viscosities of stream 1 and stream 2 are both lower than 100 mPas at the operating temperature.

31. The process of claim 1 wherein the viscosity of stream 2 is higher than 0.2 mPas at the operating temperature.

32. The process of claim 1 wherein stream 2 comprises a resin.

33. The process of claim 1 wherein stream 2 comprises a cross-linking agent.

34. The process of claim 1 wherein stream 2 comprises a rosin.

35. The process of claim 1 wherein stream 2 comprises a monomer that can be radically polymerized, or a resin with functional groups that can be radically polymerized.

36. The process of claim 35 wherein stream 2 comprises a radical initiator, that can decompose under influence of temperature, or radiation to initiate a radical polymerization.

37. The process of claim 35 wherein stream 2 comprises chain transfer agent to control the molecular weight of polymers formed in a subsequent radical polymerization.

38. The process of any one of claims 35–37 wherein stream 2 comprises an inhibitor for radical polymerization.

39. The process of claim 1 wherein stream 2 comprises a sizing agent for paper.

40. The process of claim 1 wherein stream 2 comprises bitumen.

41. The process of claim 1 wherein the concentration of the dispersed phase in the final product is in the range of 0.01–99 wt %.

42. The process of claim 1 wherein the product has a high solid contents with a concentration larger than 65 wt %. (75 wt %, 85 wt % (=present experimental limit), 90 wt %, 95 wt %).

43. The process of claim 1 wherein stream 2 in the apparatus is a solid/liquid dispersion.

44. The process of claim 1 wherein stream 2 comprises a raw material for hair care conditioner and/or fabric-softening compositions.

45. The process of claim 44 wherein stream 2 comprises quaternary surfactants.

46. The process of claim 1 wherein stream 2 in the apparatus is a dispersion of solids and/or liquids in a liquid.

47. The process of claim 1 wherein one stream is a dispersion.

48. The process of claim 1 wherein both streams are dispersions.

49. The process of claim 1 wherein one or both streams contain emulsifiers.

50. The process of claim 1 wherein stream is an aqueous fluid.

51. The process of claim 1 wherein stream 1 is an organic fluid.

52. The process of claim 1 wherein stream 2 is an aqueous fluid.

53. The process of claim 1 wherein stream 2 is an organic fluid.

54. The process of claim 1 wherein streams 1 and/or stream 2 are reactive.

55. The process of claim 1 wherein an apparatus comprising the device further comprises means to reduce the amount of continuous phase in the emulsion and increase the concentration of dispersed phase.

56. The process of claim 1 wherein stream 2 contains aromas and/or flavors.

57. The process of claim 2 wherein the dispersion is an emulsion.

58. The process of claim 36 wherein stream 2 comprises chain transfer agent to control the molecular weight of polymers formed in a subsequent radical polymerization.

59. The process of claim 1 wherein the viscosity of stream 2 is higher than 0.5 mPas at the operating temperature.

60. The process of claim 1 wherein the viscosity of stream 2 is higher than 100 mPas at the operating temperature.

61. The process of claim 1 wherein the viscosity of stream 2 is higher than 200 mPas at the operating temperature.

* * * * *

UNITED STATES PATENT AND TRADEMARK OFFICE

CERTIFICATE OF CORRECTION

PATENT NO. : 6,951,891 B2 Page 1 of 1
DATED : October 4, 2005
INVENTOR(S) : Jozef Johannes, Maria Baltussen & Jan Visser It is certified that error appears in the above-identified patent and that said Letters Patent is hereby corrected as shown below:

Column 12,
Line 16, after "stream" should be -- 1 --.

Signed and Sealed this

Twenty-ninth Day of November, 2005

JON W. DUDAS
*Director of the United States Patent and Trademark Office*